US005191341A

United States Patent [19]
Gouard et al.

[11] Patent Number: 5,191,341
[45] Date of Patent: Mar. 2, 1993

[54] SYSTEM FOR SEA NAVIGATION OR TRAFFIC CONTROL/ASSISTANCE

[75] Inventors: Philippe Gouard, Pornichet; Francois Boucquaert, Catus, both of France

[73] Assignees: Federation Francaise De Voile; Compagnie Generale De Geophysique, France

[21] Appl. No.: 786,292

[22] Filed: Nov. 1, 1991

Related U.S. Application Data

[63] Continuation-in-part of Ser. No. 278,007, Nov. 30, 1988, abandoned.

[30] Foreign Application Priority Data

Dec. 1, 1987 [FR] France ................. 87 16642

[51] Int. Cl.$^5$ .............. G01S 3/02; G01S 13/00; G01S 1/08
[52] U.S. Cl. ........................... 342/456; 342/41; 342/386
[58] Field of Search ........... 342/41, 357, 386, 458, 342/388, 46, 47, 126, 146, 450, 464, 454–456

[56] References Cited

U.S. PATENT DOCUMENTS 4,652,884  3/1987  Starker ...................... 342/357
4,742,357  5/1988  Rackley ..................... 342/457

Primary Examiner—Gregory C. Issing
Attorney, Agent, or Firm—Blakely, Sokoloff, Taylor & Zafman

[57] ABSTRACT

A system to control sea navigation or traffic of a plurality of ships or moving bodies is disclosed. The system comprises a radio navigation reference system comprising at least two reference beacon sources and a navigation central station M. Said central station M, the reference beacon sources and the ships or moving bodies are provided with a first intercommunication means from said central station M to each reference beacon source, said first intercommunication means being synchronized by said central station M, and a second intercommunication means from said central station and each reference beacon source to each ship or moving body. The system further comprises a third intercommunication means from each ship or moving body to a control station PC, said control station PC having means making it possible, through the computation of the distances from each ship or moving body to said central station M and to each reference beacon source, provided by said third intercommunication means, to compute the position of each ship or moving body with respect to the reference radio navigation system. Said third intercommunication means being tuned on the radio navigation carrier wave. There is provided means for the real-time display of the geographical position of each ship or moving body.

25 Claims, 12 Drawing Sheets

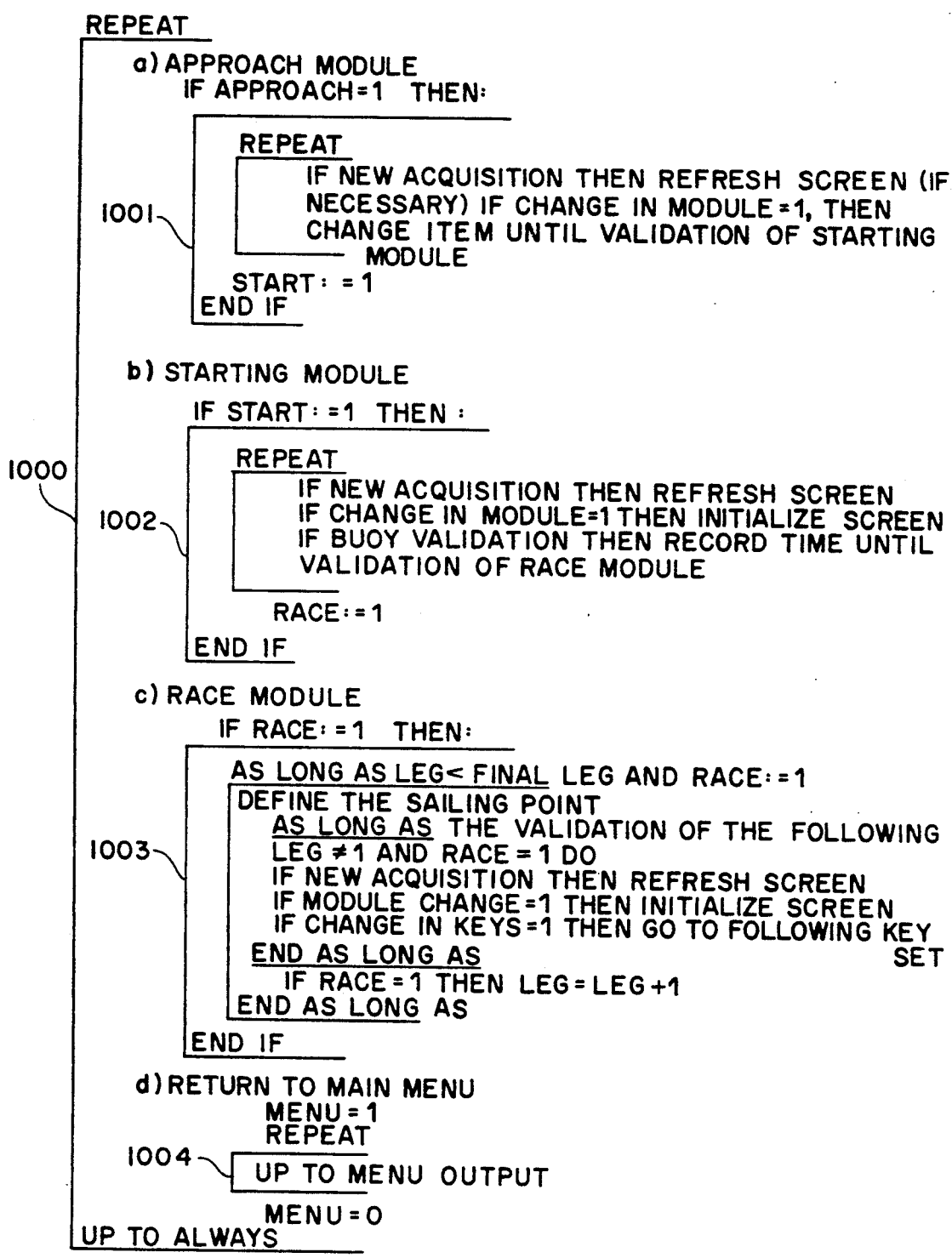

FIG. 15

1 VARIOUS INITIALIZATION OPERATIONS
2 GENERAL LOOP OF THE PROGRAM
  REPEAT
    a) APPROACH MODULE
         IF APPROACH=1 THEN:
           REPEAT
             IF NEW ACQUISITION THEN REFRESH SCREEN (IF
             NECESSARY) IF CHANGE IN MODULE=1, THEN
             CHANGE ITEM UNTIL VALIDATION OF STARTING
                    MODULE
           START:=1
         END IF b) STARTING MODULE
         IF START:=1 THEN:
           REPEAT
             IF NEW ACQUISITION THEN REFRESH SCREEN
             IF CHANGE IN MODULE=1 THEN INITIALIZE SCREEN
             IF BUOY VALIDATION THEN RECORD TIME UNTIL
             VALIDATION OF RACE MODULE
           RACE:=1
         END IF c) RACE MODULE
         IF RACE:=1 THEN:
           AS LONG AS LEG< FINAL LEG AND RACE:=1
           DEFINE THE SAILING POINT
             AS LONG AS THE VALIDATION OF THE FOLLOWING
             LEG ≠1 AND RACE=1 DO
             IF NEW ACQUISITION THEN REFRESH SCREEN
             IF MODULE CHANGE=1 THEN INITIALIZE SCREEN
             IF CHANGE IN KEYS=1 THEN GO TO FOLLOWING KEY
             END AS LONG AS                              SET
               IF RACE=1 THEN LEG=LEG+1
           END AS LONG AS
         END IF d) RETURN TO MAIN MENU
         MENU=1
         REPEAT
           UP TO MENU OUTPUT
         MENU=0
  UP TO ALWAYS

SYSTEM FOR SEA NAVIGATION OR TRAFFIC CONTROL/ASSISTANCE

This is a continuation-in-part application Ser. No. 278,007, filed Nov. 30, 1988 abandoned.

BACKGROUND OF THE INVENTION

1. Field of the Invention

The present invention concerns a system for control or assistance in sea navigation or traffic.

2. Description of the Prior Art

At present, systems for sea navigation control or assistance in real time can hardly be presented as being other than either systems comprising radar-type display systems or systems enabling route control by single sideband radiotelephonic transmission, by the transmission of way-points.

These systems are, of course, useful but have the drawback of possessing little flexibility in their use. For, while they enable, at the most, real time position-finding of ships, these systems do not enable any overall redistribution of navigational information in each of the ships concerned, the transmission of data from a central control station to each ship being essentially restricted to a radiophonic link between the pilot of each ship and the navigation control center.

An object of the present invention is to overcome the above-mentioned drawbacks by the implementing of a system for the control of sea navigation or traffic, wherein information on the navigational or traffic parameters of one or more ships, which is normally available with the control body, may be made available at discretion to each ship or moving body separately or simultaneously.

Another object of the present invention is the implementation of a system for assistance in navigation or traffic, wherein the pilot of each ship has an interactive system at his disposal, enabling him to benefit from real-time assistance with navigation or traffic.

Another object of the present invention is the implementation of a navigational assistance system with great flexibility of use, capable of changing and adapting itself inasmuch as it can be used to take into account both the specific nature of the navigational parameters proper to each ship and the use or the situation of the use of this ship.

Another object of the present invention is the implementation, when the ship or ships considered are sailboats, of a system for assistance in regatta management and assistance in competitive navigation.

SUMMARY OF THE INVENTION

An outstanding feature of the system, according to the invention, for controlling or providing assistance in sea navigation or traffic involving a plurality of ships, is that it comprises a radio navigation reference system, comprising:

a radio navigation reference system comprising:
  at least two reference beacon sources,
  a navigation central station M, said central station M, the reference beacon sources and the ships or moving bodies being provided with:
    a first intercommunication means from said central station M to each reference beacon source, said first intercommunication means being synchronized by said central station M,
    a second intercommunication means from said central station and each reference beacon source to each ship or moving body,
  a third intercommunication means from each ship or moving body to a control station PC, said control station PC having means making it possible, through the computation of the distances from each ship or moving body to said central station M and to each reference beacon source, provided by said third intercommunication means, to compute the position of each ship or moving body with respect to the reference radio navigation system, said third intercommunication means being tuned on the radio navigation carrier wave,
means for the real-time display of the geographical position of each ship or moving body.

The sea navigation control system for several ships or moving bodies, according to the invention, can be applied to remote monitoring of ships or moving bodies, the piloting of ships to give them entry into harbour zones, and to the routing of ships, to the monitoring of fishing fleets, the monitoring and direct management of sports events, training in the control and monitoring of military vessels with secret identity codes, the triggering of alarms in real time for the monitoring of a fleet of boats, the control of automobile vehicles in races or rallies, etc.

BRIEF DESCRIPTION OF THE DRAWINGS

Other features and advantage of the sea navigation and/or traffic control and/or assistance system for several ships or moving bodies, according to the invention, will be better understood from the following description and drawings, of which:

FIG. 12b shows a more detailed view of the lay-lines of FIG. 12a;

FIG. 15 shows a general flowchart of the tactical program, showing the relative arrangement of the different program modules.

DESCRIPTION OF PREFERRED EMBODIMENTS

Figure 1:
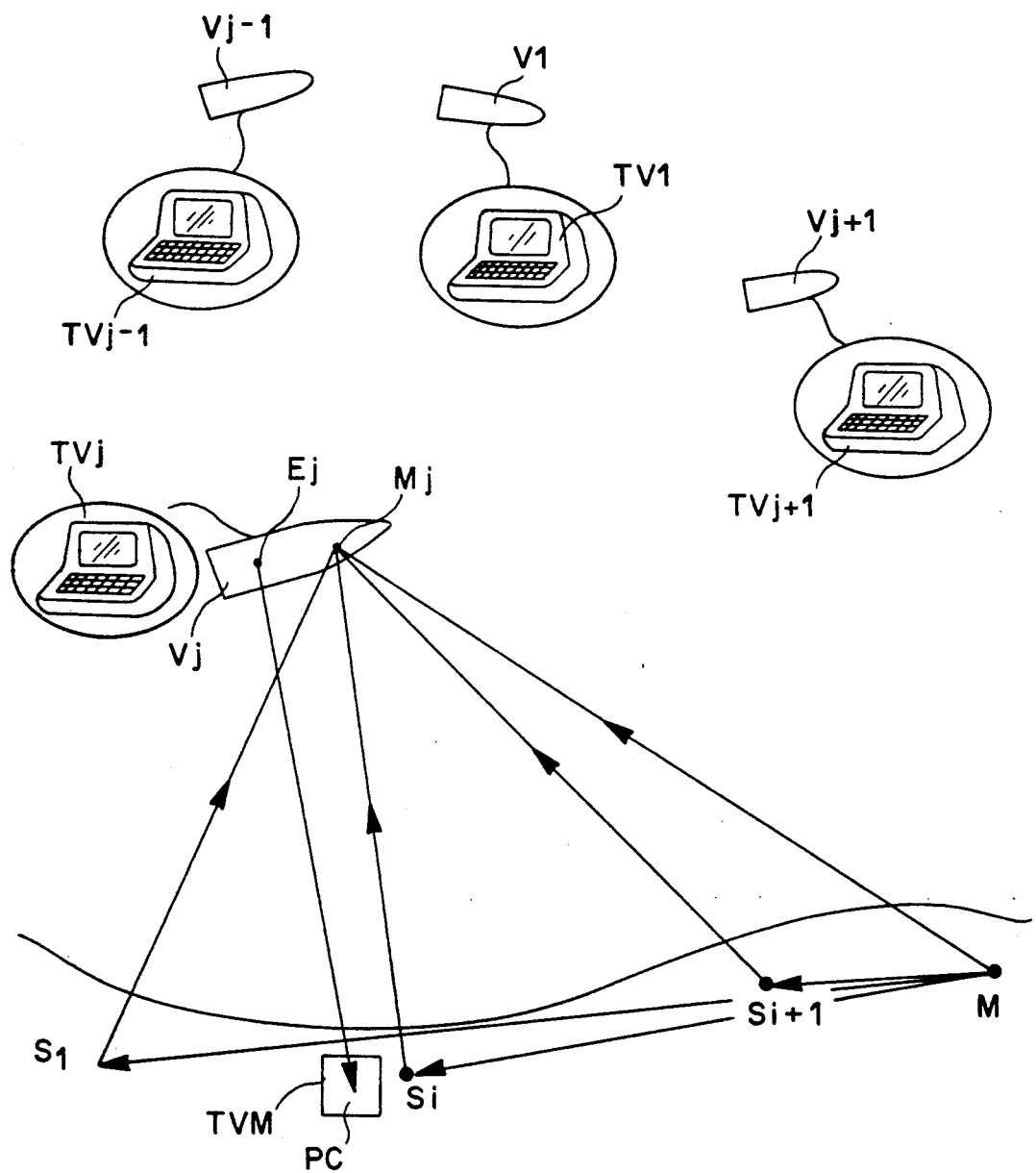
FIG. 1 gives a schematic view of a system for sea navigation and/or traffic control according to the invention.

The invention shall be described firstly with reference to FIG. 1.

According to the above-mentioned figure, the system for controlling sea navigation or traffic of several ships or moving bodies, marked Vj in the above FIG. 1, has a reference radio navigation system comprising at least two reference beacon sources, marked Si, Si+1 in the above-mentioned figure.

A fixed or mobile central station M for navigation control is further provided. The central station M and the ships or moving bodies Vj are provided, with a first intercommunication means, from the central station M to each reference beacon sources marked Si, Si+1, said first communication means being synchronized by said central station M, and a second intercommunication means Mj from the central station M and each reference beacon source to each ship or moving body Vj.

In addition, the system to control sea navigation or traffic of several ships or moving bodies of the invention comprises a third intercommunication means Ej from each ship or moving body to a control station PC which is fixed or mobile. Said control station PC has means making it possible, through the computation of the distances from each ship or moving body to said central station M and to each reference beacon source provided by said third intercommunication means, to compute the position of each ship or moving body Vj with respect to the reference radio navigation system. Said third intercommunication means is tuned on the radio navigation carrier wave. Of course, a computer can thus be used to compute so-called geometrical coordinates with respect to the reference beacon stations Si, Si+1.

It is to be pointed out that the knowledge of the position of the control station PC is not required since the path $\overline{PCVj}$ can be eliminated by said computation.

For example, in the case of two reference beacon sources S1 and S2, the control station PC receives signals corresponding to paths $$\overline{MVj} + \overline{PCVj} \tag{1}$$

$$\overline{MS1} + \overline{S1Vj} + \overline{PCVj} \tag{2}$$

$$\overline{MS2} + \overline{S2Vj} + \overline{PCVj} \tag{3}$$

Making differences (2)−(1) and (3)−(1), we get $$\overline{MS1} + \overline{S1Vj} - \overline{MVj}$$

$$\overline{MS2} + \overline{S2Vj} - \overline{MVJ}.$$

Since M, S1, S2 belongs to the radio navigation reference system, distances $\overline{MS1}$ and $\overline{MS2}$ are known. The position of ship or moving body Vj is thus defined by $$\overline{S1Vj} - \overline{MVj} = C_{st}$$

$$\overline{S2Vj} - \overline{MVj} = C_{st}'.$$

This means that Vj is at the intersection of two hyperbolae having respective focii S1,M and S2,M.

It should be appreciated that this result is independent of the position of the control station PC.

As a very advantageous consequence, said control station can be fixed or mobile, with no requirement of the knowledge of its position.

Contrary to known localization systems, the system of the invention involve only one carrier wave, e.g. that of the radio navigation system itself. More particularly, the data from the ships or moving bodies are not transmitted to the control station PC (where computations are made) by means of a further HF telemetry system but through the VLF of the radio navigation system.

In conclusion, the system of the invention operates by measuring directly synchronized time delays, resulting in a very good position occuracy of about 1 meter. This is why the system of the invention can be used in regattas, for instance, to obtain the exact trajectory of each competitor.

Furthermore, display means marked TVM, for the real-time display of the position of each ship or moving body Vj with respect to the control station PC are provided on said control station PC.

Thus, in accordance with a particular aspect of the navigation control system, according to the invention, the reference radio navigation system is a fixed radio navigation system with hyperbolic type localization.

According to an especially advantageous aspect of the sea navigation control system, according to the invention, the control station PC is mobile and consists of a master ship such as a pilot ship. Furthermore, as shall be described below in the description, a master ship may consist, in the case of a regatta of sailboats, of a committee boat from which the regatta is managed.

In the example, where the ratio navigation system is a hyperbolic type of radio navigation system, the second intercommunications means Mj of each ship or moving body Vj enabling intercommunication from the central station M and each reference beacon source Si, Si+1 to each ship or moving body Vj, and the third intercommunication means Ej to the control station PC advantageously include a transponder.

Advantageously, the control station PC is provided with a SB5 type beacon. This type of beacon enables the simultaneous localization of a plurality of ships or moving bodies Vj. This radio communication system is marketed by the firm, Société d'Etude de Recherches et de Construction Electronique (SERCEL) under the trade name of SYLEDIS.

According to another particularly advantageous feature of the sea navigation control system for a plurality of ships or moving bodies Vj, according to the invention, the control station PC is fixed and consists of a control land-based station in the vicinity of harbour installations.

If the moving bodies are automobiles in a race or a rally, the control station PC is fixed and may be positioned so as to be overlooking the racecourse or rally area. The control station may then be placed on board a sounding balloon or similar device for example.

The sea navigation or traffic control system for a plurality of ships or moving bodies, according to the invention, is not restricted to the use of a land-based reference radio navigation system.

Figure 2:
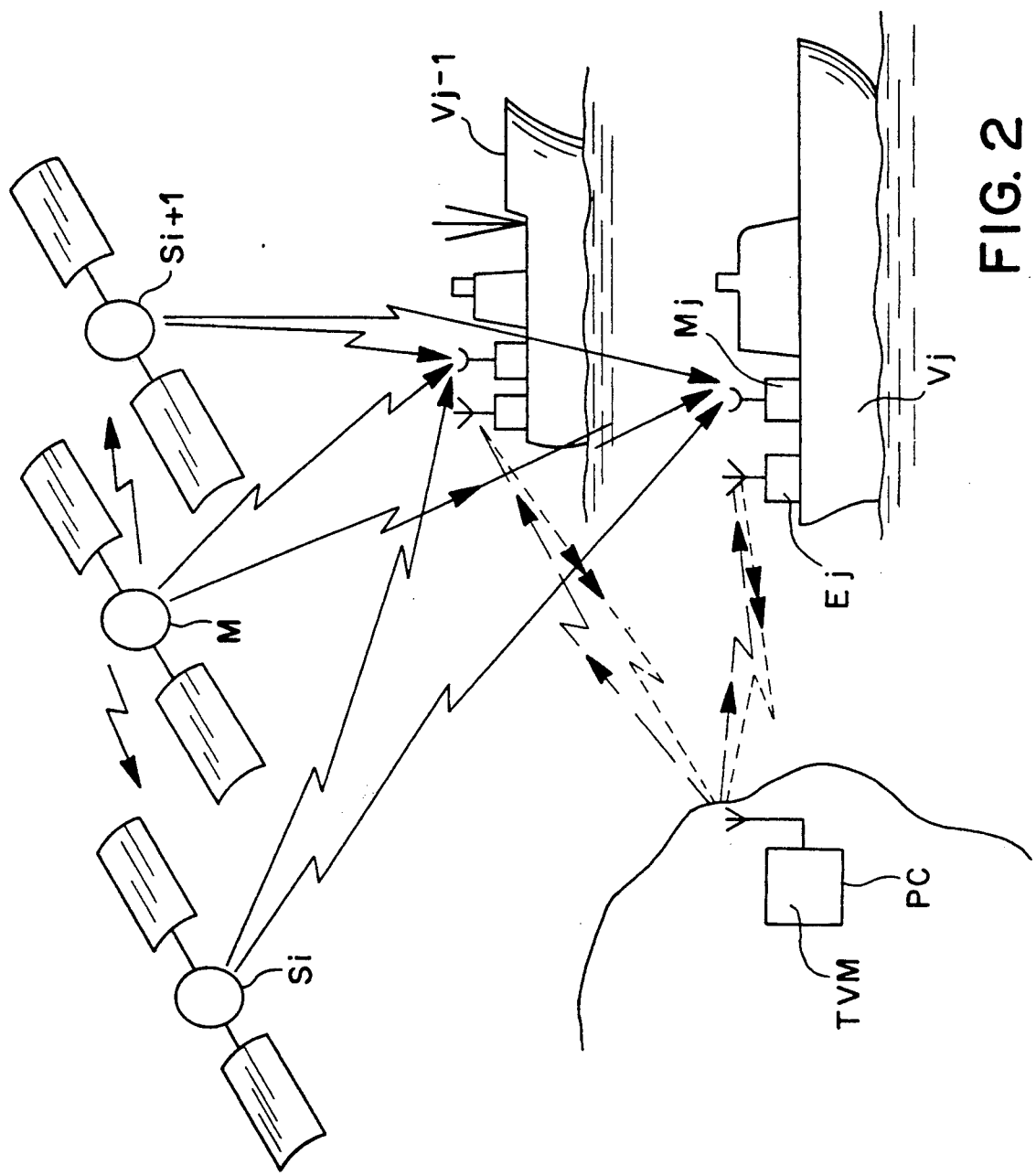
FIG. 2 shows a particular alternative embodiment of a navigation or traffic control system according to the invention.

In particular, as shown in FIG. 2, a radio localization system, consisting of a network of artificial satellites, may easily be used. A system of artificial satellites of this type may consist, as a non-restrictive example, and in a particularly advantageous way, of a system such as the GPS (global positioning system) satellite network forming the NAVSTAR system.

This type of system enables position-finding in all three coordinate axes X, Y, Z, and three-dimensional position-finding of any moving body requires the simultaneous reception of at least four satellites, while position-finding in a plane X, Y, tangential to the surface of the globe requires, for example, reception from three satellites.

In a manner similar to that of earth-based radio localization systems, the satellite radio localization system, such as the GPS system, can be used to obtain positional data by measuring the propagation time of the signals transmitted by the satellites to a receiver moving body Vj.

In an embodiment of this type, as shown in FIG. 2, the second intercommunication means Mj are receivers of GPS signals emitted by the satellites and may advantageously consist of a GPS receiver with the trade name TR5S, marketed by the firm SERCEL. The control station PC may advantageously consist of an emitter/receiver system providing for a two-way link between the moving body Vj and the control station PC in order to transmit the positional parameters measured, or identity codes relating to each moving body Vj, to the control station PC and the selective transmission in reverse, from this station to each moving body Vj, of useful data for navigational or traffic assistance to the corresponding moving body Vj.

Of course, depending on the application used, the moving bodies subjected to the traffic or navigation control and/or assistance system according to the invention may consist of aircraft, ships or vessels or land-based vehicles.

Figure 3:
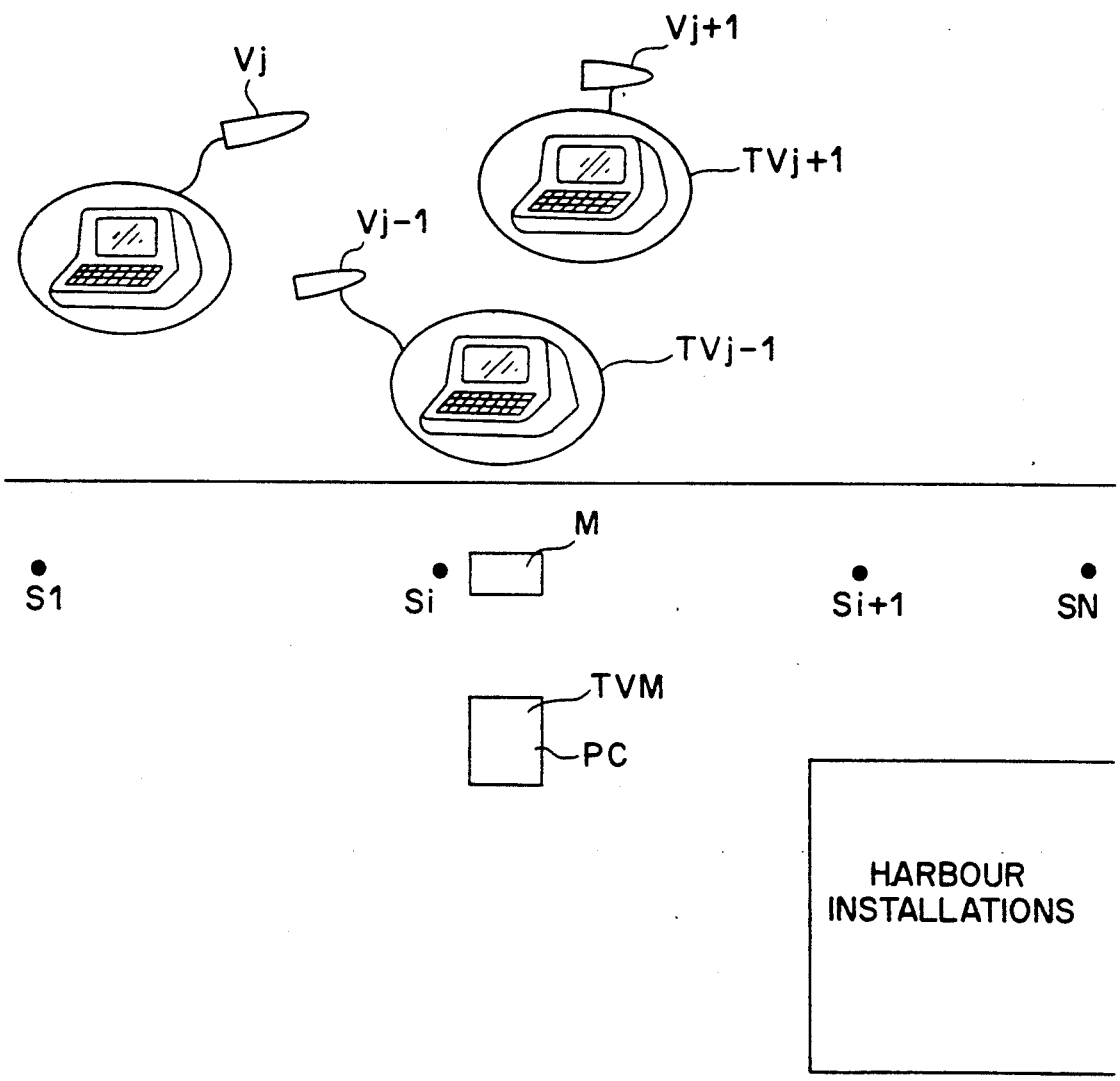
FIG. 3 shows a first alternative non-restrictive embodiment of a system for assistance in navigation or traffic according to the invention.

FIG. 3 shows a sea navigation control system of this type. When the control station PC is fixed and formed by a control land-based station, it may advantageously have, directly connected to the computing means a data service center connected to the computing means by means of a modem, for example. The data service center will itself be connected to a plurality of display terminals, for example, of the Minitel type, in order to ensure display, at different places, of the panorama or configuration of navigation of the ships or moving bodies Vj. Furthermore, a remote projection system may be directly connected to the computing means.

Furthermore, as will be observed, especially in FIG. 3, and in an example where the sea navigation control system according to the invention is designed to form a navigation control and assistance system, each ship Vj has, in addition to the intercommunication means Vji, between each reference beacon source Si, Si+1 and each ship Vj, a display terminal marked TVj, TVj−1, TVj+1, enabling the real time display of at least the position of the order j ship or ships considered, with respect to the control station PC. Of course, the display terminals TVj are directly connected to the intercommunication means of each corresponding ship Vj.

According to an especially advantageous characteristic of the navigation control and assistance system according to the invention, the display terminal TVj of each ship Vj consists of a microcomputer on each ship Vj, the microcomputer being provided with its peripheral elements.

It will be understood that the sea navigation control and/or assistance system according to the invention enables the automatic localization of ships such as sailboats, fishing boats, lifeboats at sea and boats approaching a harbour zone or in navigation, it being possible to achieve this in real time.

The trajectory obtained from programs or software adapted from the above-described protocols by processing of the above-mentioned distance measurements can be expressed in the form of positions in coordinates of the Cartesian or geometrical type and can then be advantageously converted into latitude and longitude type coordinates, thus making it advantageously possible to plot a route called a "sea-bed route" for each ship Vj, sucessive positional data enabling the definition of both the course of each ship Vj and its speed.

It will be understood that, in a particularly advantageous way, the acquisition of the position of each ship Vj with reference to the sea bed or coastline can then be compared with a so-called surface position obtained by means of standard instruments such as burgees, anemometers, speed sensors or electronic compasses and it is then possible to calculate, in particular, a vector representing the sea current in amplitude and direction, the distance and the time between a determined ship Vj and a mark or buoy capable of acting as a beacon for a course, the distance of a ship Vj from a ship Vj+1 and, if necessary, in the case of the management of regattas, the results in terms of time and distance, for example.

The fact of knowing the positions and movements of each ship Vj also enables determining the most efficient piloting of one ship Vj with respect to another, for example, in the case of regattas having an event of the type called match racing with two competitors.

Finally, the system for sea navigation control and/or assistance according to the invention enables, by processing at the central station M located on land for example, to determine the course and speed of each ship Vj, the results being then retransmitted in the form of the defining of an optimum route for each ship Vj. The beacons SB5 marked by the firm SERCEL in France can be used to achieve this transfer and the corresponding display of the optimum route for each of the ships Vj considered.

An especially advantageous embodiment of a sea navigation control and/or assistance system according to the invention shall be described with reference to FIGS. 4a and 4b in an example where the intrinsic navigation parameters of each ship Vj are integrated into the system.

Figure 4A:
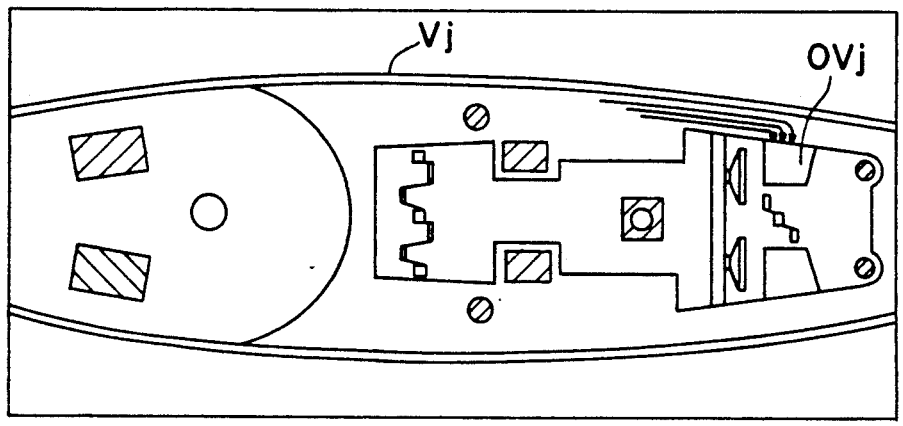
FIGS. 4a and 4b show a second preferred alternative embodiment of a system for assistance in sea navigation according to the invention.
Figure 4B:
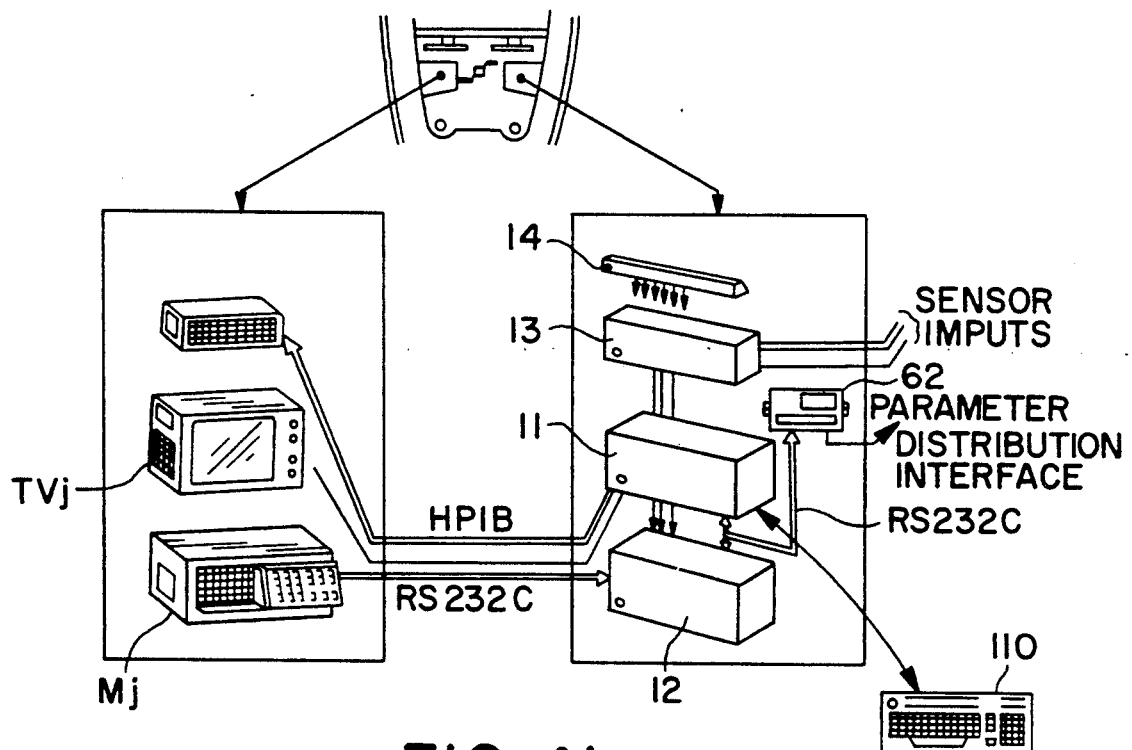

As shown in FIG. 4a and 4b the onboard microcomputer OVj may advantageously be fitted on board, when the ship Vj consists of a sailboat, for example in a hermetic rack. As shown in FIG. 4b in particular, the onboard microcomputer OVj has a first master microcomputer 11 providing for tactical direction of navigational assistance. The master microcomputer has its peripheral elements, such as a keyboard marked 110.

The onboard microcomputer OVj also a second slave microcomputer 12, called an acquisition microcomputer, also provided with its peripheral elements. The second slave microcomputer 12 enables the acquisition of the dynamic parameters or data of the ship Vj considered, and the sequencing of the intercommunication means Mj. The peripheral elements of the master microcomputer consist of the forementioned keyboard 110 and a printer marked 111, the master microcomputer 11 being also connected to a display terminal forming the forementioned display terminal TYj. The master computer 11 and the slave computer 12 may advantageously consist of microcomputers marked by the firm Hewlett Packard under the reference HP 9920. The master computer 11 and the slave computer 12 are connected by an RS232 type BUS link. The intercommunication means Mj of the ship Vj are also connected to the slave computer or acquisition computer 12 by means of a RS232C type link.

Figure 5A:
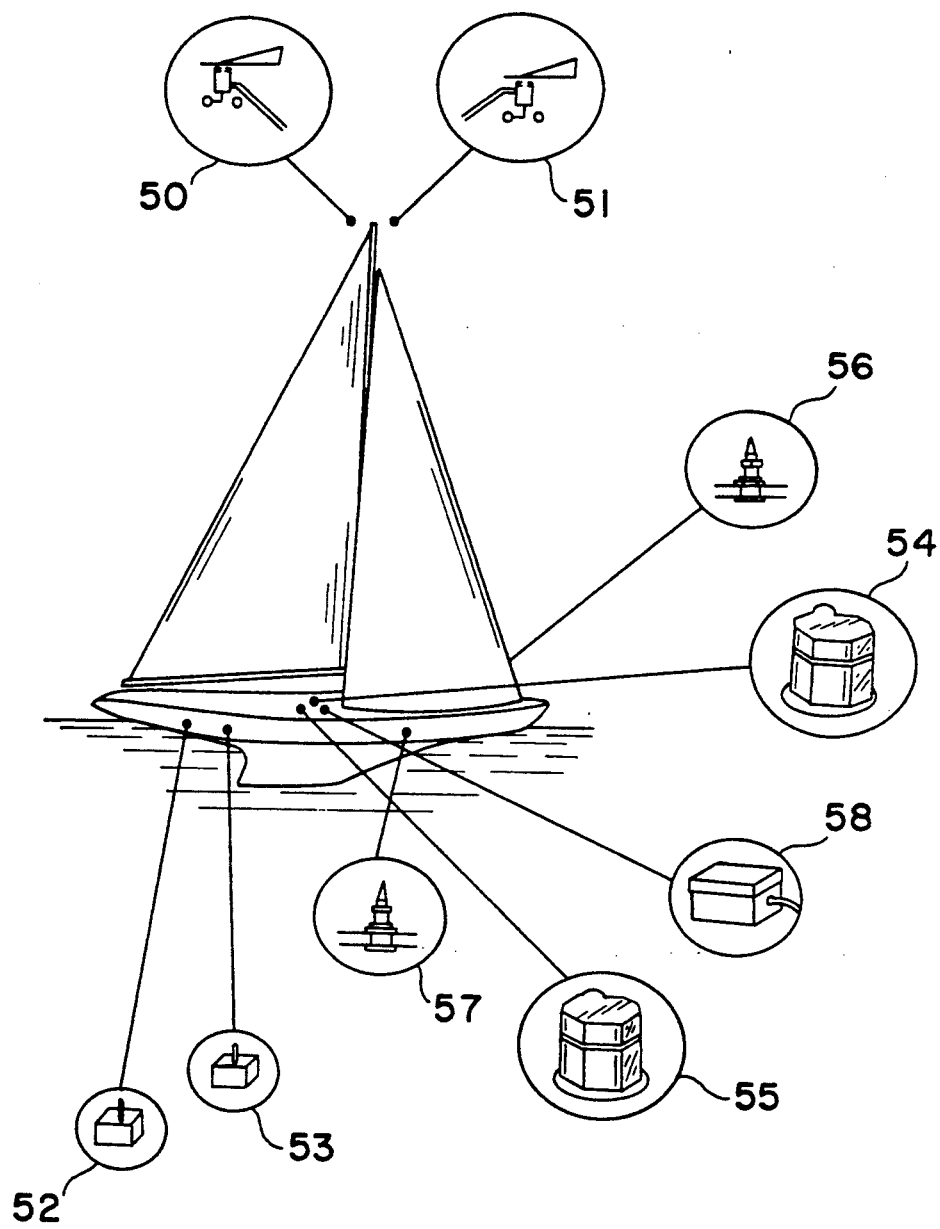
FIGS. 5a and 5b show a non-restrictive, exemplary view of an especially advantageous embodiment of a navigation assistance system according to the embodiment of FIGS. 4a and 4b, more especially adapted to assistance with the navigation of a ship comprising a sailboat.

In order to provide for the acquisition of the dynamic parameters of the ship Vj considered, each of the ships Vj has, as a non-restrictive example, when the ships Vj consist of sailboats, as shown in FIG. 5a, a downwind (beam wind) burgee and anemometer marked 50, a windward burgee and anemometer marked 51, a rudder angle sensor 52, a trim angle sensor or movable flap forming an anti-drift plane 53, a port compass 54 and a starboard compass 55 and a portside speed sensor 56 and a starboard speed sensor 57 and an inertial guidance system 58 giving information on heel and pitch.

Each of the above-mentioned sensors is used to deliver a signal representing the dynamic parameter corresponding to the sailboat or ship Vj to the second slave computer. Of course, the link with each of the sensors, which consist of standard type sensors in the corresponding field of measurement, is achieved by means of a sensor interface, 13 in FIG. 4b, the sensor interface circuit 13 being itself connected to a 24-volt supply voltage power distribution panel 14.

Figure 5B:
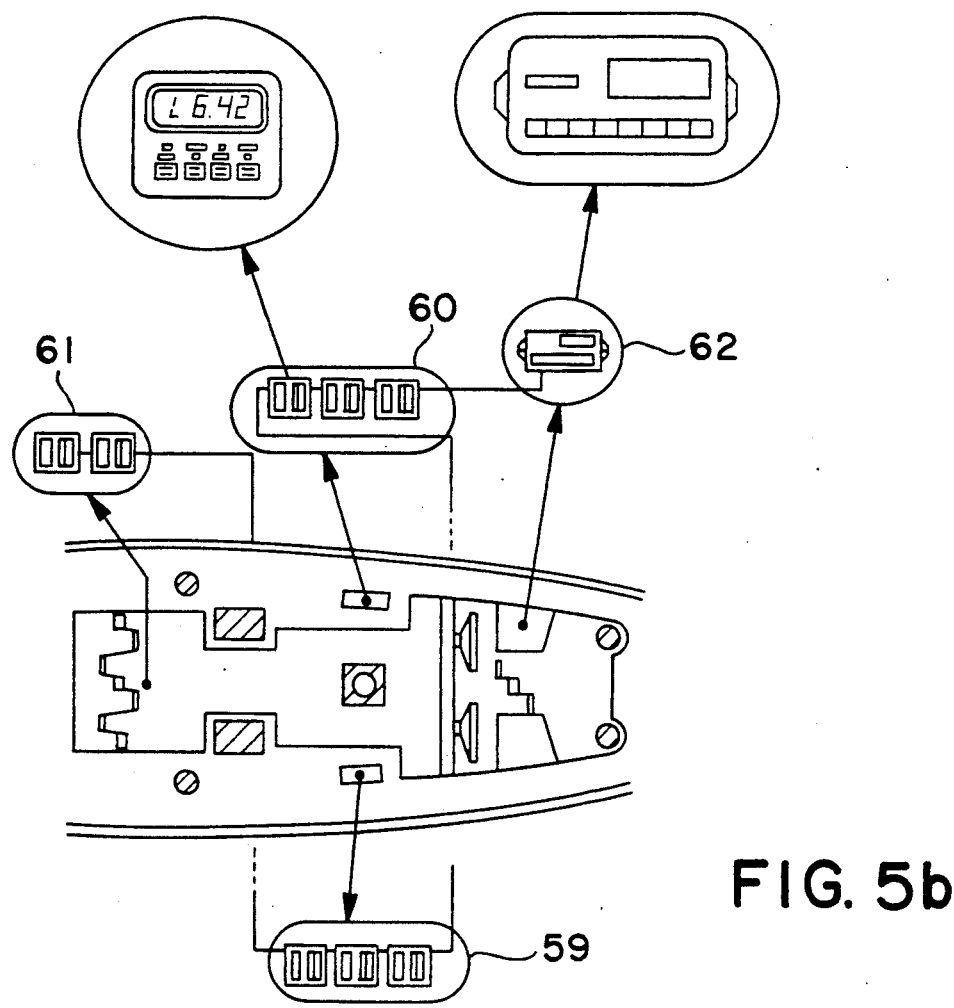

Furthermore, as shown in FIG. 5b, each sailing ship Vj has, at the key stations of the sailboat, one or more display systems enabling the display of the values, in real time, of one or more corresponding dynamic parameters corresponding to the ship. In FIG. 5b, a starboard display system is marked 59, a portside display system is marked 60 and a central display system is marked 61. The set of display systems 59, 60 or 61 is connected by a display interface circuit shown in FIGS. 4b and 5b to the slave acquisition microcomputer 12 by means of an RS232C type link.

The set of equipment shown in FIGS. 4a, 4b, 5a, 5b, provides for the control of the electronic instruments and their follow-up on the display monitor TVj of each ship Vj, the acquisition of data emitted by the intercommunication means Vji, the distribution of the dynamic parameters of the ship Vj on all the display units 59, 60, 61, said display units consisting, for example, of liquid crystal display units placed at different key positions of the ship Vj, and the transmission of dynamic operation parameters or data from the ship Vj to the master or tactical microcomputer 11 and the storage of data in a measuring catalogue in the storage memory of the slave microcomputer 12. This memory may consist, for example, of a bubble memory or a hard disk.

The master microcomputer 11 works on a task-sharing basis with the slave computer 12 known as an acquisition computer and fulfils all the functions for the piloting of the ship Vj and, especially when it is a sailboat fitted for a regatta, provides for all the usual tactical functions entailed by official regatta rules. Of course, the program of the computer or tactical microcomputer 11 may be suited to the nature of the ship Vj. If the ship Vj is a fishing boat or a freighter, such as a cargo ship, the so-called tactical program is replaced by a navigation program which may be reduced to a program to control the essential operating parameters of the corresponding ship.

Should the ship Vj consist of a sailboat, in an advantageous non-restrictive way and in order to integrate parameters intrinsic to the meterological and/or topological environment of the navigation zone into the navigational assistance system according to the invention, the computer means CM of the central station and/or the second slave microcomputer 12 of each ship Vj have data stored in their storage memory, representing the coastline of the navigation zone, and data representing the speed range and direction of winds and currents in the navigation zone.

Figure 6:
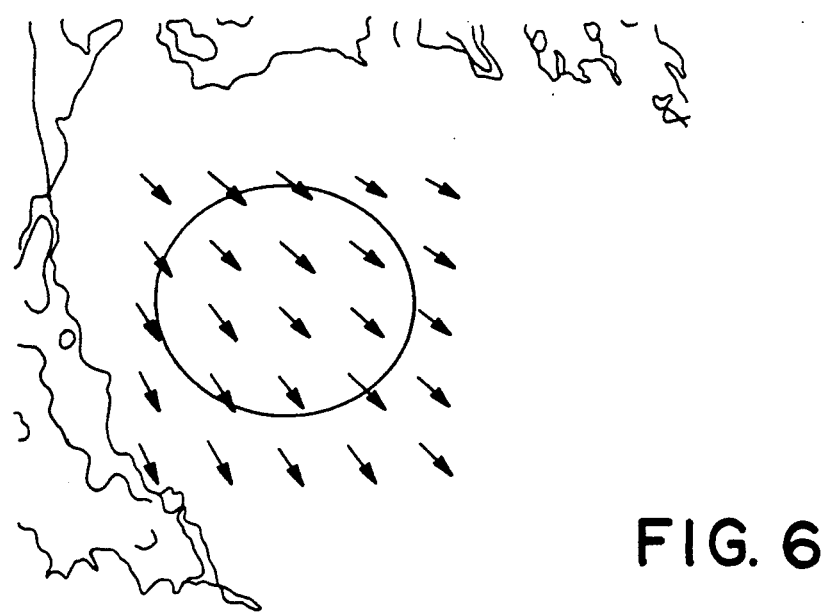
FIG. 6 gives a non-restrictive exemplary view of a screen page display method which is especially suited to assistance with the navigation of ships comprising sailboats.

FIG. 6 gives a non-restrictive view of a screen page which could appear on the display means TVj of each of the ships Vj or at the display terminal TVM of the central station M. The above-mentioned screen page includes the corresponding coastline along which the corresponding ship Vj is moving as well as a depiction of the wind range represented by arrows distributed in the navigation zone. The above-mentioned data are transmitted by the second intercommunication means Mj from the central station M to each of the ships Vj and may then be stored in the storage memories of the acquisition computer or microcomputer 12. Of course, the storage may be performed directly in the storage memories of the acquisition microcomputer 12, and the set formed by the tactical microcomputer 11 and the acquisition microcomputer or slave microcomputer 12 could thus become autonomous.

Of course, the above data are periodically refreshed. The above-mentioned data relating to wind range are established statistically depending on the navigational zone and, especially, on the corresponding coastline, an estimate of the probable development of the wind range in direction and amplitude being obtained, for example, by the method developed through the work of A. Kuhn, G. Sabin and D. Wistorff. This work is more particularly known as the method of breeze polygons. For a more detailed description of the use of this method for statistical the statistical determination of wind ranges in amplitude and direction, reference may be made to the publication by Dominique Bourgeois, *Les Secrets de la baie de Quiberon* (The Secrets of Quiberon Bay), in the journal "Bateaux", No. 314, 1984.

Moreover, the navigational assistance system according to the invention enables the integration into it of the intrinsic parameters of the ship Vj or sailboat. To this end, the computer means CM of the central station M and/or the second slave microcomputer 12 comprise, stored in the corresponding storage memory, data representing the performance values of the ship Vj in its dynamic operation.

Figure 7A:
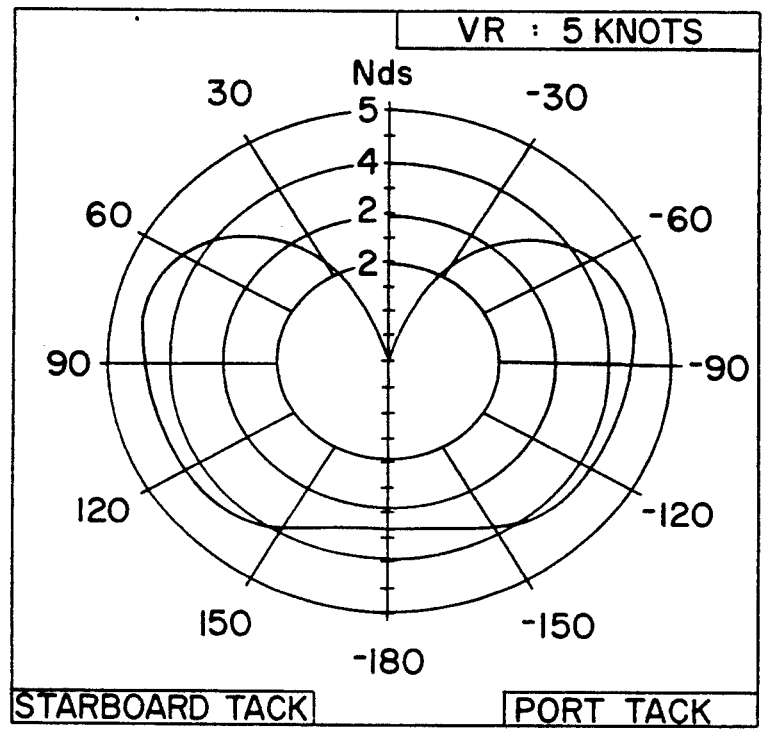
FIGS. 7a and 7b respectively show a chart of data or parameters intrinsic to a considered ship, such as a sailboat, in polar and Cartesian coordinates, said parameters consisting of the speed, expressed in knots, of the sailboat in relation to the wind direction angle with the center line of the ship.
Figure 7B:
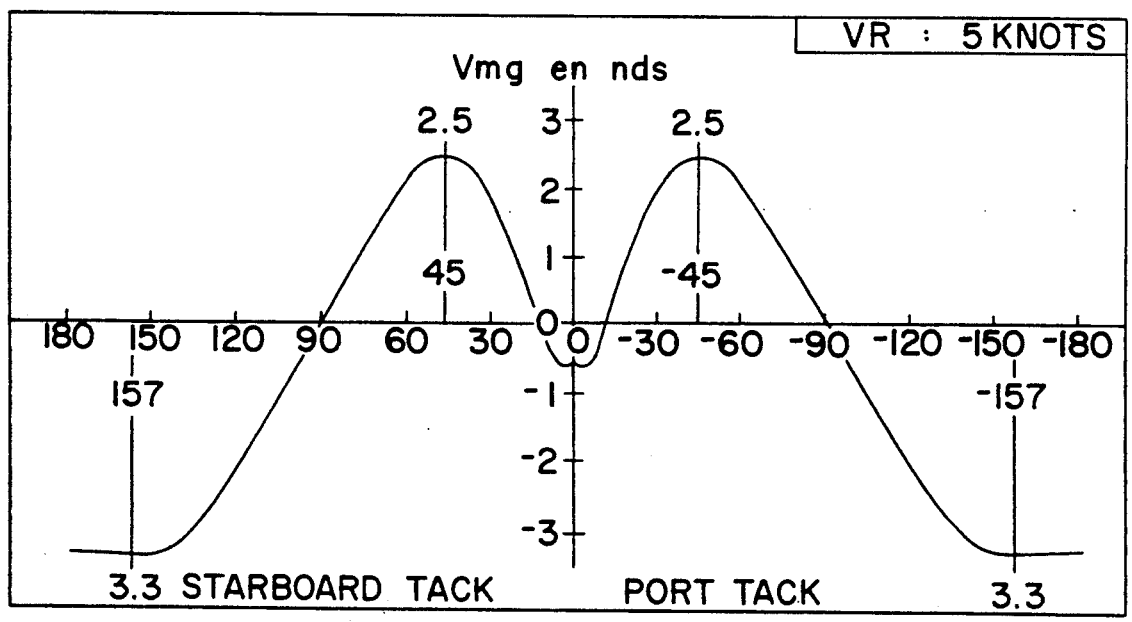

As shown in FIGS. 7a and 7b, when the ship Vj is a sailboat, the data representing the ship Vj in dynamic operation correspond to a representation, in polar coordinates as regards the FIG. 7a or Cartesian coordinates for FIG. 7b, of the speed of the ship Vj, in knots, relative to the angle of the wind direction angle with the ship's center line. In FIG. 7a, the polar radius is graduated in speed expressed in knots and the corresponding angle is expressed in degrees.

In FIG. 7b, the x-axis is graduated in degrees and the y-axis is the effective speed of the boat, known as "velocity made good" or VMG. The velocity made good is the windward speed in the axis of the true wind, i.e. the projection of the speed of the boat in the direction of the true wind. This value is very useful for handling the sailboat when it navigates windward and downwind since the purpose of these movements is to approach or to move away from the wind as fast as possible. The velocity made good or VMG therefore represents this speed and constitutes a precise value of what is called a course/speed compromise. The velocity made good or VMG depends on the goal set: for example, in the case of downwind navigation, the velocity made good will be the highest speed in the direction of the downwind buoy.

According to an advantageous characteristic, the data shown in FIGS. 7a and 7b correspond to the relative surface or sea bed speed of the ship Vj and the angles of direction of the wind at the angle of the true wind or apparent wind direction.

Of course, the above-mentioned values comprise noteworthy reference values for which the velocity made good or VMG of the ship Vj is maximum in the case of windward or downwind navigation. These noteworthy values may then be used judiciously by the tactician of the ship Vj.

Figure 8:
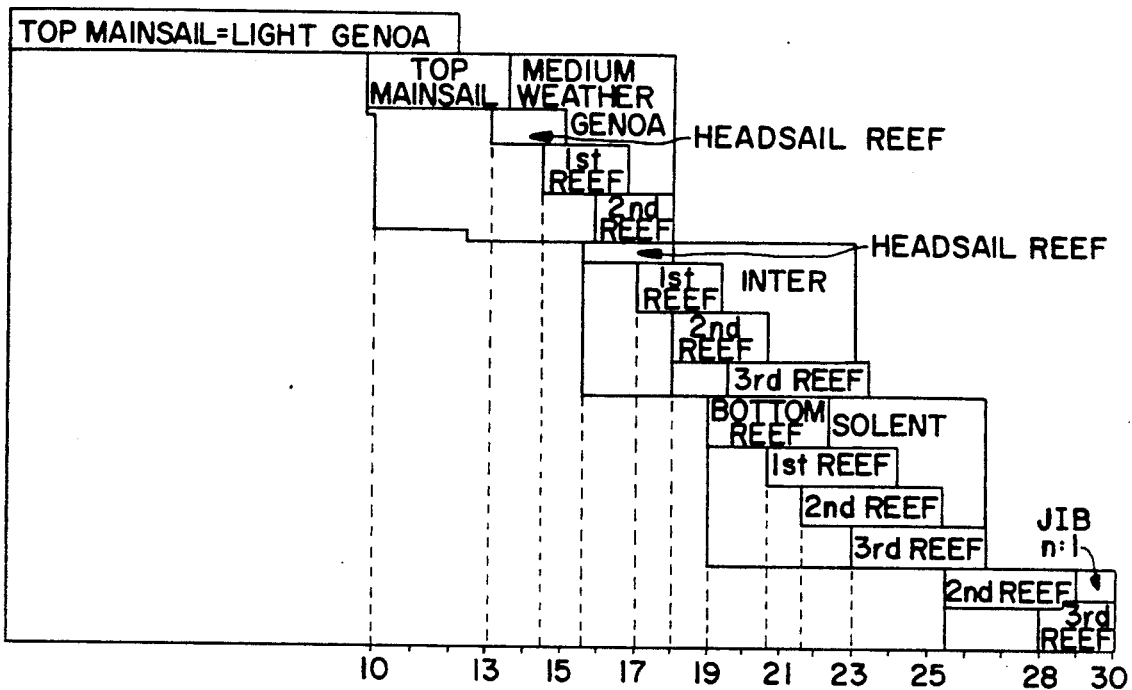
FIG. 8 is a chart, in an example where the ship consists of a sailing ship, for assistance in decision-making relating to the optimum changing of the sails of a sailboat.

Furthermore as shown in FIG. 8, the data representing the ship when it is a sailboat correspond to a choice of a combination of sails depending on wind forecasts. The choice of sail combinations corresponding to that for which a change in the foresail, namely in the case of a sailboat, the jib and the genoa, take place as late as possible. FIG. 8 shows the condition or position of the sails as a function of the true wind speed expressed in knots, said position being the optimum one to ensure the latest possible changing of the foresail. It will be noted that, for low wind velocities, the mainsail and/or the light genoas are completely unfurled and the bottom reef and the first and successive reefs are successively folded depending on the rising wind speed, the foresails being then successively changed to medium-weather genoas, inter, solent and jib. The chart representing sail changing data in FIG. 8 can then be used to inform the tactician about the best possible combination of sails for a ship of a considered model.

The navigational control and/or assistance system according to the invention, when the ships Vj consist of sailboats, can be used to integrate parameters intrinsic to the qualities of the helmsman of each ship Vj. To this end, the computing means CM of the central station M and/or the first master microcomputer 11 may comprise, stored in the storage memory of these means, data representing the ideally steered ship or sailboat Vj. The ideal nature of the steering of the sailboat Vj is defined as the maintaining of a substantially constant phase angle relationship between the defined course obtained by the helmsman for the sailboat Vj and the direction of the true wind.

Figure 9:
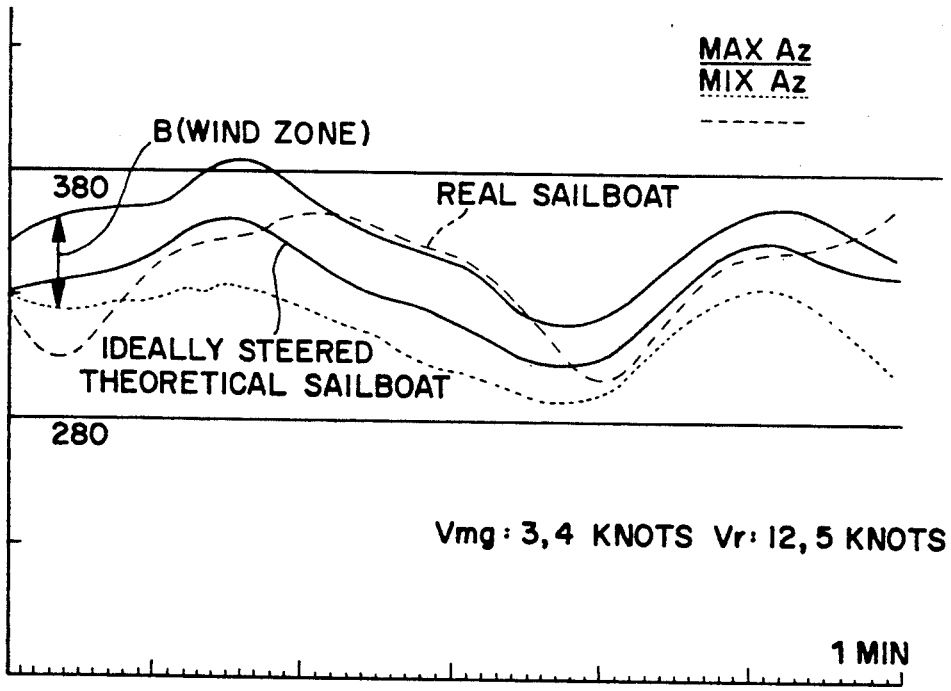
FIG. 9 shows a definition chart of an ideally steered sailboat, making it possible to take into account the intrinsic parameters of the helmsman's qualities.

FIG. 9 shows, on the y-axis, the azimuth of the true wind direction and, on the x-axis, the variation of this azimuth as a function of time. The reading is taken for one minute. The direction of the true wind fluctuates between two extreme values around a mean value which varies periodically, the effective wind direction being included in a wind zone, marked B, having a substantially constant width. FIG. 9 plots, firstly, the corresponding variation in the orientation of the center line of a real sailboat steered by a competent helmsman, this line being represented by dashes and bearing the reference VR. The direction or phase angles between the mean azimuth of the wind and the orientation of the center line of the real ship is not constant and the effective efficiency of the real sailboat in velocity made good, for example, is not at the optimum level. On the contrary, the constant phase angle of the theoretical sailboat corresponding to the trace VT, drawn with a line in FIG. 9, has a substantially constant phase angle with respect to the instaneous azimuth of the true wind. The direction or azimuth of the true wind is defined in time as the mean azimuth corresponding to the direction of the true wind on which there is superimposed an instantaneous variation in this direction with respect to the mean direction, a variation caused by turbulence phenomena proper to the whole formed by the navigation zone and the sailboat, the direction of the true wind being defined, as mentioned above, by a wind zone B.

The above-mentioned data therefore make it possible to compare the path of the real helmsman with that of an ideally steered sailboat, and to look for the navigational sequences to be improved.

During tests, it has been observed that a very highly competent helmsman can follow the path of the ideally steered sailboat for about substantially thirty seconds out of a total period of one minute. This means that, for 50% of the time, the helmsman navigates to perfection. However, in the meantime, all the delay that accumulates during periods when the wind is imperceptibly unfavorable (this imperceptible character being due to the fact that variations in the wind azimuth in a wind zone cannot be detected by the compass because they are too small) the helmsman has to make an effort to accept deviating from the normal route to preserve his maximum speed. On a windward leg, statistically, according to recordings made, it has been observed that there are as many favorable wind rotations there are unfavorable ones. This simply means that, for 50% of the time, the helmsman must display great mastery at the tiller to accept this obligatory and temporarily unfavorable situation. Taking into account data relating to the path of an ideally steered sailboat makes it possible to take its differences into account and, for example, in a span of ten seconds, between a helmsman who perfectly follows a wind rotation of 5° at a speed of six knots and one who keeps a straight path is a difference in gain over wind of about 1.80 meters.

The intrinsic parameters of the above-defined sailboat or of the helmsman or the relative parameters relating to the navigation zone are particularly useful when the navigational assistance system according to the invention is used for assistance in competitive navigation or sailing regattas.

Figure 10:
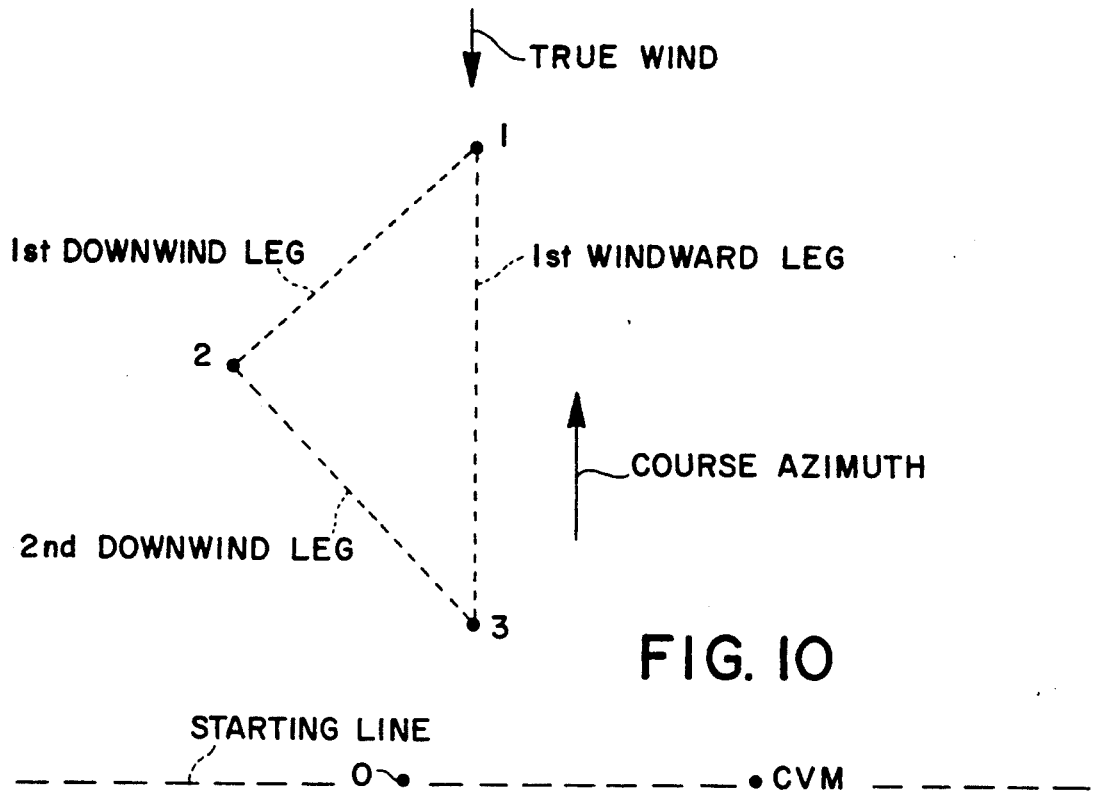
FIG. 10 is a drawing showing a course of a standard type of official regatta, in the form of a closed circuit, including at least one first windward leg, one first downwind leg and one second downwind leg.

FIG. 10 shows an official regatta course, which takes the form of a first buoy or starting marker, 0, a committee boat entrusted with directing and supervising the regatta, said boat being marked VM, a first buoy marked 3 being in the vicinity of the starting line formed by the alignment of the first buoy 0 and the committee boat VM, a second buoy or mark 1 and a third buoy 2 defining the course. It will be noted that, in general, the mean azimuth of the course is represented by the direction defined by the buoys 3 and 1, said direction being aligned with the mean direction of the true wind. Thus, after crossing the starting line, and after navigation in the azimuthal direction of the course, the path between the marks 3 and 1 forms a first windward course, the path between the marks 1 and 2 forms a downwind (reaching) course of first downwind leg and the path between the marks 2 and 3 form a downwind course or second downwind leg.

In order to provide for navigational assistance in the case of a course as shown in FIG. 10, the computer CM of the central station M or the master computer 11 of each ship Vj may have a tactical program for navigation assistance. This tactical program is a menu type program comprising, at least after display on the display screen PVj corresponding to the navigation zone map, a first data acquisition sub-program called up by the validation of an approach mode, a second starting sub-program called up by the validation of a starting mode and a third navigation sub-program called up by the validation of a navigation mode. Of course, in the case of a regatta, the third navigation sub-program consists of a so-called race program called up by the validation of a race mode.

Should the ships Vj consist of sailboats about to take part in a competitive regatta, the first data acquisition program will advantageously comprise a monitoring method enabling the display, on the screen of the display means TVj, of the raw values of the various above-described sensors, a procedure for changing the scale of the navigation zone map, a procedure to input the position in latitude and longitude of the above-mentioned marks 0, 1, 2, 3 as well as the position in latitude and longitude of the committee ship VM, a procedure to validate the time remaining before the start and a procedure to introduce the value of the sea current in terms of direction and speed.

Figure 11:
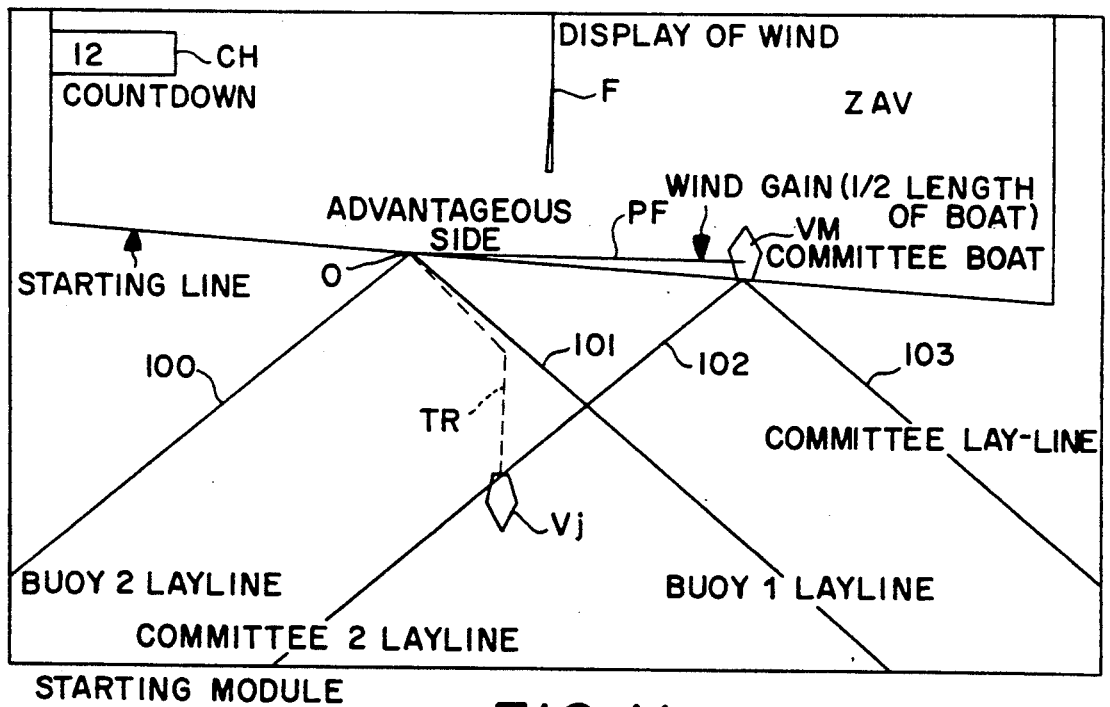
FIG. 11 shows a display screen page of the tactical program for assistance in navigation when said tactical program corresponds to a module of the starting mode for an official race or regatta.

The procedure to input the latitudinal and longitudinal position of the marks of the regatta course may advantageously comprise sub-routines corresponding to the input of data on the course marks or buoys in latitude or longitude, the validation of the position of the committee boat, the validation of the starting mark namely the mark 0, the input of the mean azimuth of the course and the validation of the last mark of the course, the input of the length of the course and the validation of the return stage. For, when a ship Vj, consisting of a sailboat, is at the starting point it travels over a stretch, before the starting line, enabling it to go near the starting buoy 0 and the committee boat VM without, however, crossing the starting line under penalty of disqualification. These preliminary manoeuvers have been shown in FIG. 11. Following the shift to the starting mode, the program corresponding to the starting mode enables the display, on the display screen TVj of each ship Vj, of a line (marked PF in FIG. 11), perpendicular to the true wind direction, on a screen page corresponding to the wind zone (ZAV in FIG. 11) beyond the starting line, with an arrow, marked F in FIG. 11, indicating the instantaneous true wind azimuthal direction. The line PF thus indicates the advantageous port tacking or starboard tacking side of the ship, lay-lines defining, for the sailboat Vj considered, the permitted boundary zone wherein said sailboat can tack. In FIG. 11, the lay-lines are marked 100, 101, 102, 103. Lay lines are defined as the limits of the windward angle available to a sailboat Vj and are joined to a reference point such as a mark, the mark 0 for the lines 100 and 101, the committee boats VM for the lines 102 and 103. The windward angle is defined by the angle of the direction of the true wind with the center line of the ship joined to the above-mentioned reference point. Furthermore, the screen page also shows the effective path of the sailboat in the boundary zone. This path, shown with dashes in FIG. 11, is marked TR. Furthermore, a timer CH is shown. This timer is used for the countdown to the starting instant.

The different pieces of data that appear on the screen page are especially useful to the tactician of the sailboat Vj inasmuch as they can be used to make the position of the sailboat Vj effective, with respect to the starting line in view of the direction of the wind, and can thus give him an idea of the optimum route to be followed at the starting instant. Finally, at request, the tactician can ascertain the distance to be travelled in following a lay-line route and can thus make a better assessment of the route and option to be taken to make a good start.

After the navigation mode is validated and, in particular, after the validation of the race mode when the starting line has been crossed, when the sailboat Vj is in competition, the navigation program corresponds to a race mode comprising, in particular, procedures to define and display the lay-lines of the sailboat Vj with reference to the following mark, for example the mark No 3 shown in FIG. 10. This procedure includes a sub-routine to compute and display the distance from the ship Vj to the lay-line towards which it is moving, this distance being parallel to the other lay-line. Furthermore, the race mode includes a procedure for changing scale and a procedure to display the direction of the true wind in a defined earlier period of time, a so-called burgee procedure used to indicate the wind change zones. Furthermore, a procedure for sailing downwind can be provided, along with a mark validation procedure enabling the helmsman or tactician to validate the fact that the master computer has taken a tacking manoeuver into account. Of course, a procedure for returning to the main menu has been designed to provide great flexibility in the use of the menu type interactive program.

For, it is in this stage of navigation during an official regatta that the program actually finds its purpose. The first goal is to inform the tactician on the geographical position by the most explicit possible means. This information is given to the tactician by means of particularly suited screen pages which enable him to grasp the maximum amount of information by simply observing the display terminal TVj.

Figure 12A:
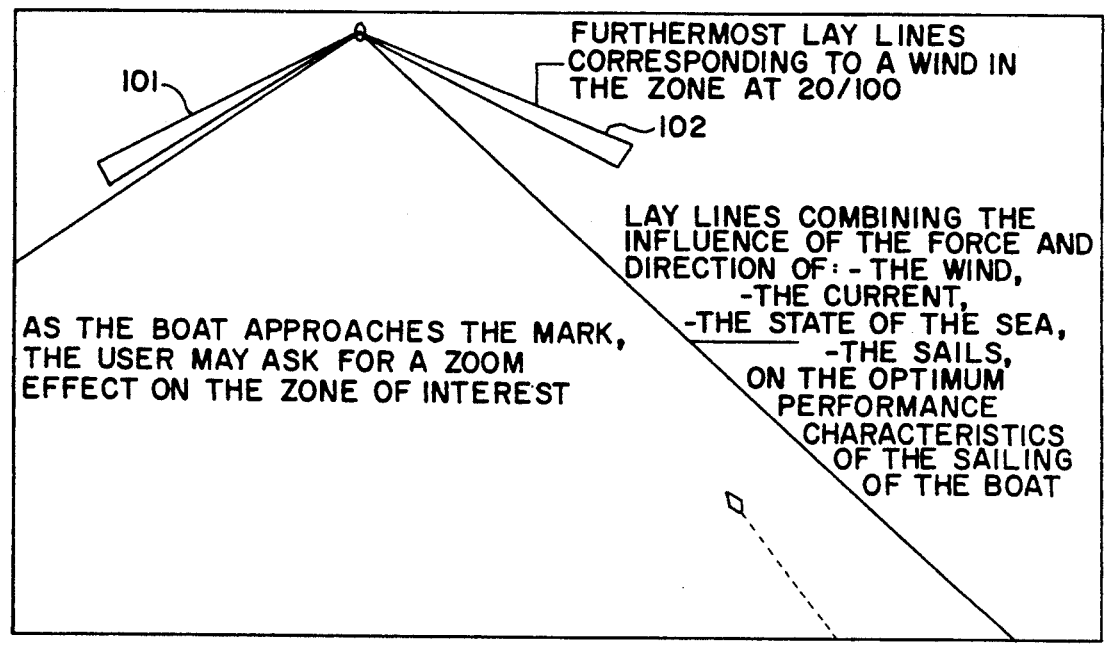
FIG. 12a shows a display screen page of the tactical program for assistance in navigation when said tactical program corresponds to a navigation module type of module, more particularly called a racing module.
Figure 12B:
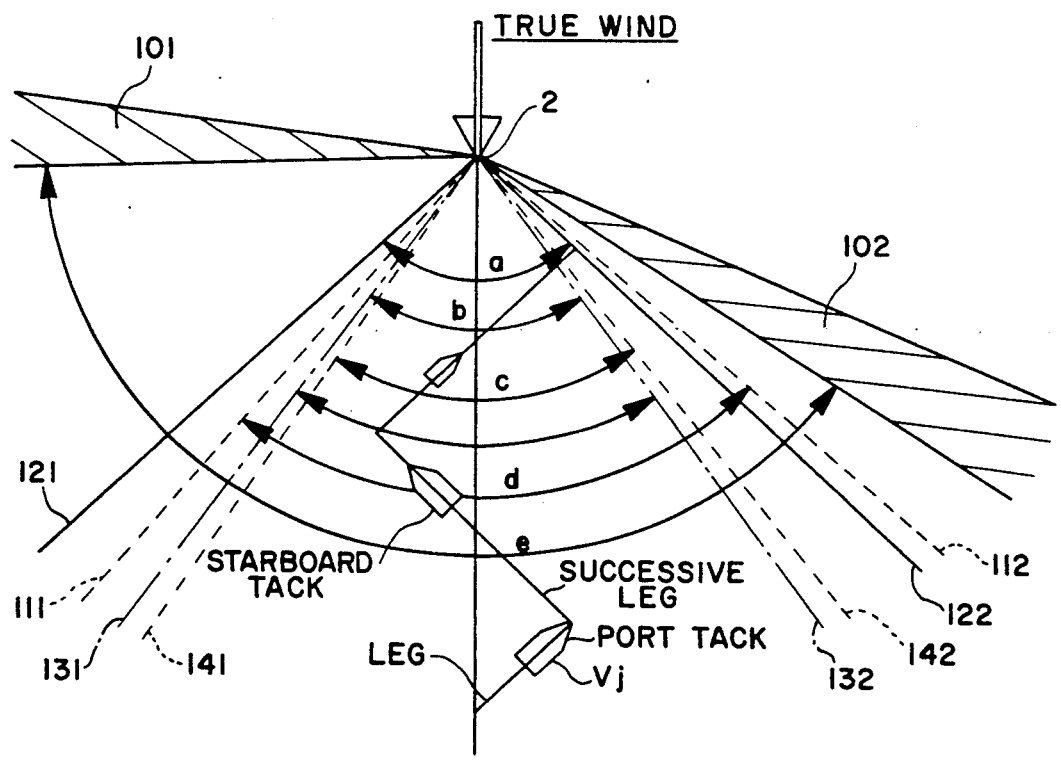
Figure 14:
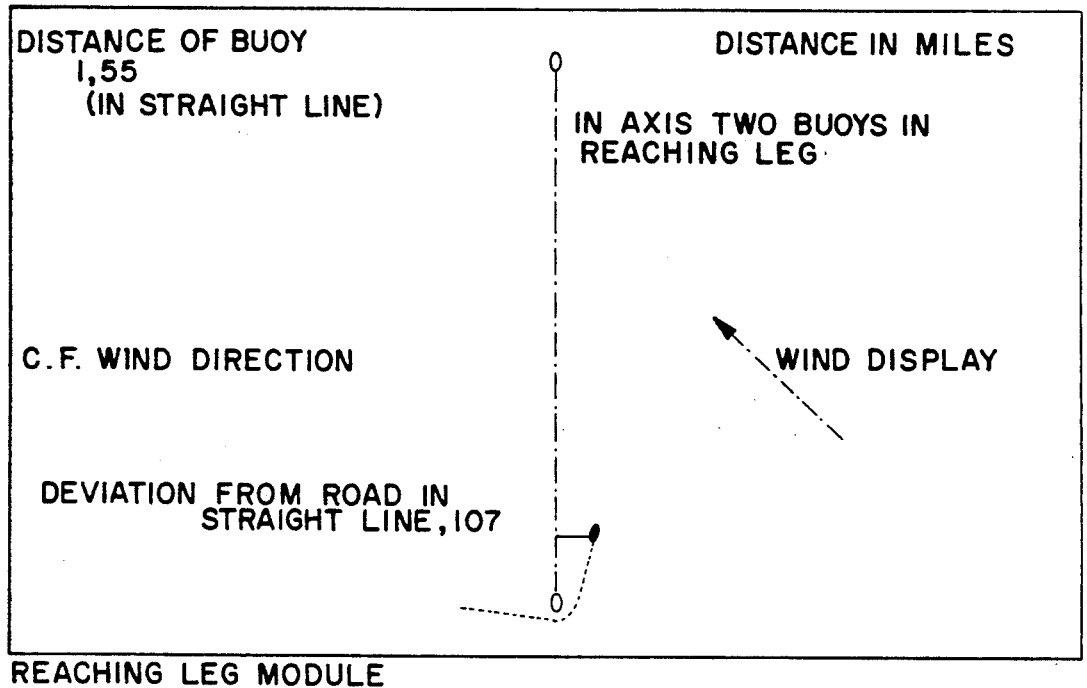
FIG. 14 shows a display screen page of the tactical program for navigation assistance when this program corresponds to a racing module and, especially, to a downwind navigation procedure.

To this end, the method for defining and displaying the lay-lines of the sailboat Vj enable the display of said lines on a screen page in a pie chart type of diagram, as shall be described in greater detail with reference to FIGS. 12a and 12b.

As shown in the above-mentioned figures, the chart advantageously has a plurality of circular sectors or lines comprising two circular sectors 101, 102, defining an angular zone corresponding to the limits of the lay-lines depending on the relief, said limits being computed from the sea-bed position of the ship Vj with reference to the coastline. The above-mentioned screen page further has two first lines 111, 112, contained in the boundary zone, defining an angular zone d corresponding to two lay-lines computed with respect to the sea bed, i.e. with respect to the coastline and two second lines 121, 122, contained in the boundary zone and defining an angular zone a corresponding to two lay-lines computed from the surface speed of the ship Vj and that of the apparent wind, these parameters being given by the different sensors. Furthermore, two third lines 131 and 132 are provided. These lines are contained in the boundary zone and define a corresponding angular zone b corresponding, in view of the hydrodynamic characteristics of the ship, to ideal sailing lay-lines. Two fourth lines 141 and 142 are further contained in the boundary zone and define an angular zone c corresponding to lay-lines representing, in time, changes in wind direction with respect to the time scale, the lay-lines being defined on the basis of statistics on wind changes in time at the corresponding navigational zone.

Furthermore, a second aim is to give the tactician information on the state of the wind encountered with respect to micrometerological characteristics during the data-gathering campaign on the regatta site.

Figure 13:
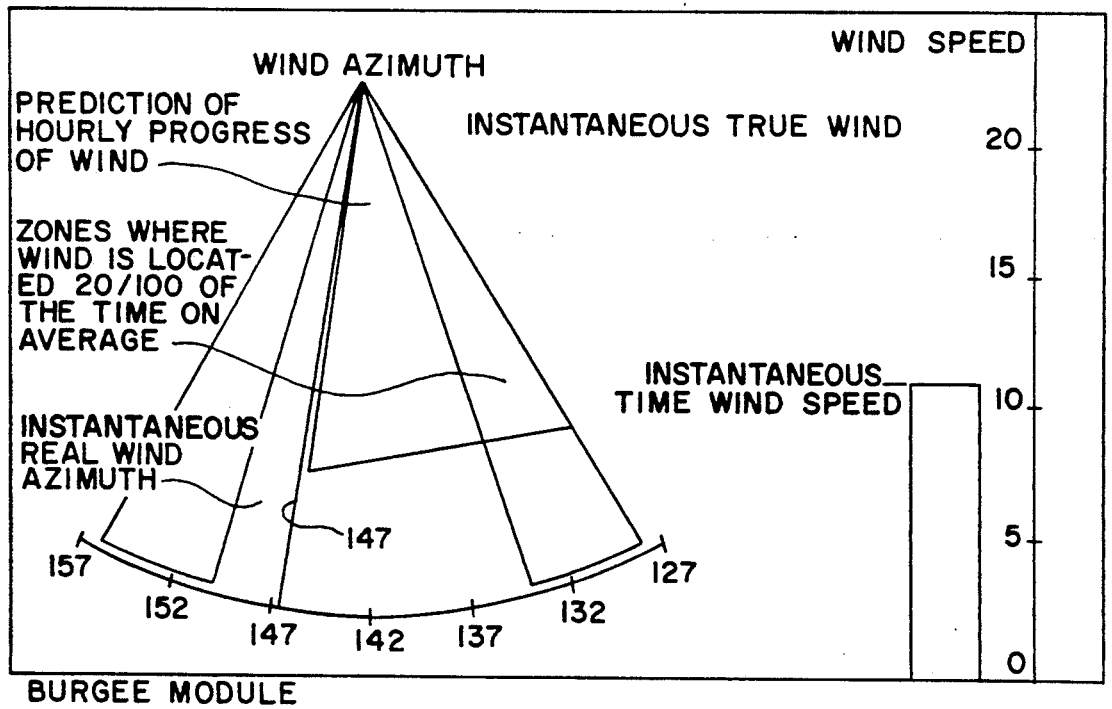
FIG. 13 shows a display screen page of a tactical program for assistance with navigation when this program corresponds to a racing module and, in particular, to a procedure for displaying the direction of the true wind, or the burgee (wind vane) procedure.

To this end, the procedure for displaying the direction of the true wind in a determined prior period of time and the burgee procedure enable the display, on a screen page, in a pie chart type of diagram, as shown in FIG. 13, of the chronological account of the direction of the true wind since the beginning of the recording with an indication of right-hand and left-hand extremes of the instantaneous direction of the true wind and an estimate of changes in the direction of the true wind during a given period.

Furthermore, an indication of the amplitude of the speed of the instantaneous true wind is also given on a screen page shown in FIG. 13.

Furthermore, the procedure for downwind sailing may advantageously comprise a screen page enabling the display of the distance in the axis of two the downwind leg buoys, namely, the buoy or mark No. 1, 2, and 2, 3 for example. This screen page can be used to give the tactician information on the deviation from the straight line route between the two downwind leg buoys or markers, the display of the wind respect to the axis of the two downwind leg buoys as well as the distance to the next mark for example. This distance is expressed in a straight line.

A general goal of the above-described tactical program is to actually integrate the above-mentioned first two goals pertaining to information on the geographical position and on the state of the wind encountered with the characteristics of the sailboat Vj to give an idea of the optimum route and of the risks incurred in taking this route.

This goal is achieved through the display of the lay-lines where there is shown the sailboat Vj and the next mark with the optimum routes joining this mark. The zones 101 and 102 of FIGS. 12a and 12b form lay-line stops, indicating possible variations in lay-lines, and the hachured zone corresponding to the sector 101, 102 shows the high risk zone which must not be crossed. Furthermore, the tactician can question the computer on the effect of a fluctuation, by a number of degrees n, of the above-mentioned lay-lines on the distance to be travelled. All the information thus presented to the tactician enables him to integrate all the information for more efficient assistance with the tactics to be adopted during the regatta.

Moreover, a module also enables preparation for the next leg, in providing tactical information with the conditions encountered when the request is made, for example information on the optimum route gain, value of the apparent wind, etc.

A brief description of the structure of the tactical program shall be given with reference to FIG. 15 which corresponds, to a greater degree, to a flowchart of the above-mentioned program.

In this figure, the tactical program for navigational assistance comprises the following: after a stage of various initializing operations, a general repetition loop (1000) in which the sub-programs (1001, 1002, 1003, 1004) corresponding to the approach or starting mode and to the navigation or race mode and to the mode for returning to the main menu are integrated.

We have thus described a sea navigation or traffic control and/or assistance system which is particularly efficient inasmuch as this system is highly adaptable. For, it enables the piloting of the widest possible variety of ships such as fishing boats, freighters such as cargo ships, and sailboats. In the particular example of sailboats, the navigational assistance to these boats, when they are in competition in official regattas, would appear to be particularly advantageous inasmuch as the system enables the integration of characteristics intrinsic to each sailboat, depending on its inherent hydrodynamic characteristics, these characteristics being introduced into the system in the form of values or data representing measured performance chart and mathematical models.

Furthermore, the navigational control and/or assistance system according to the invention can also be used to integrate the intrinsic parameters of the helmsman piloting this sailboat, with the helmsman's natural qualities such as his touch with the tiller where the steering manner is identified with reference to the ideal piloting of a sailboat of the same type.

Finally, when applied to sailboats, the navigation control and assistance system according to the invention can also be used to integrate characteristics proper to the navigational zone or environment, said characteristics corresponding to the short-term or medium-term prediction of winds, to the simulation of a wind zone and, if necessary, to the introduction of values relating to direction and speed of currents.

The implementation of the system according to the invention enables the real-time management of about forty sailboats, for example, by means of a computer placed in a central station as described earlier.

It will be easily understood that the system for sea navigation control and/or assistance according to the invention enables both the management of a large number of boats, moving bodies or ships as well as the creation of a system of assistance in navigational apprenticeship inasmuch as the commands given from the central station or the values of parameters relating to each sailboat can be transmitted to each of these sailboats for display and to be used by the helmsman concerned.

We claim:

1. A system to control sea navigation or traffic of a plurality of ships or moving bodies, comprising:
a radio navigation reference system comprising:
at least two reference beacon sources, a navigation central station M, said central station M, the reference beacon sources and the ships or moving bodies being provided with:
- a first intercommunication means from said central station M to each reference beacon source, said first interconnection means being synchronized by said central station M,
- a second intercommunication means from said central station and each reference beacon source to each ship or moving body, means for the real-time display of the geographical position of each ship or moving body, a third intercommunication means from each ship or moving body to a control station PC, said control station PC having computer means making it possible, through the computation of the distances from each ship or moving body to said central station M and to each reference beacon source, provided by said third intercommunication means, to compute the position of each ship or moving body with respect to the reference radio navigation system, said third intercommunication means being turned on the radio navigation carrier wave, said computer means having a tactical program for navigation assistance, of the "Menu" type, comprising at least, after the display, on a display screen, of the map of the navigation zone:
- a first data acquisition sub-program called up by validation of an approach mode;
- a second starting sub-program called up by validation of a starting mode; and
- a third navigation sub-program called up by validation of a navigation mode.

2. A system according to claim 1, wherein said reference radio navigation system is a fixed radio navigation system or a network of artificial satellites.

3. A system according to claim 1, wherein the control station PC is mobile and consists of a master ship.

4. A system according to claim 1, wherein said control station PC is fixed and consists of a land-based center.

5. A system according to claim 2, wherein the second intercommunication means of each ship or moving body, enabling intercommunication from the central station M and each reference beacon source to each ship or moving body, and the third intercommunication means to the control station PC, comprise a transponder.

6. A system according to claim 1 wherein, in order to set up a system for control and assistance with navigation or traffic, each ship or moving body comprises a display terminal enabling the real time display of at least the geographical position of said ship or moving body.

7. A system according to claim 6 wherein, in order to integrate navigational parameters intrinsic to each ship in the navigation assistance system, said onboard computer comprises:
- a first master microcomputer used for the tactical direction of navigational assistance, provided with its peripheral elements,
- a second slave microcomputer, called an acquisition computer, provided with its peripheral elements and enabling the acquisition of the dynamic parameters or data on the ship considered and the sequencing of the intercommunication means.

8. A system according to claim 7 wherein, in order to provide for the acquisition of the dynamic parameters of the ship considered, each of the ships has, when said ships are sailboats:
- a downwind anemometer or burgee;
- a windward anemometer or burgee;
- a rudder angle sensor;
- a trim angle sensor;
- a port compass and a starboard compass;
- a port speed sensor and a starboard speed sensor;
- an inertial guidance system giving information on heel and pitch; each of the above-mentioned sensors being used to give a signal representing the corresponding dynamic parameter to said second slave microcomputer.

9. A system according to claim 7, wherein said sailboat has one or more display systems at the key stations of the boat, enabling the real-time display of the value of one or more corresponding dynamic parameters of the boat.

10. A system according to claim 1 wherein, in order to integrate parameters instrinsic to the meteorological and/or topological environment of the navigation zone into the navigation assistance system, said computing means of said central station and/or said second slave microcomputer of each ship comprises, stored in their storage memory:
- data representing the coastline of the navigation zone or area;
- data representing the range of speed and direction of the winds and currents in said navigation zone, said data being transmitted by said second intercommunication means from the central station to each of the ships and/or being stored in said storage memories of said acquisition computer.

11. A system according to claim 10, wherein said data are periodically refreshed.

12. A system according to claim 1 wherein, in order to integrate parameters intrinsic to the ship or sailboat into the system for navigation assistance, said computing means of said central station and/or said second slave microcomputer have, stored in the corresponding storage memory, data representing the dynamic parameters of the ship during its dynamic operation.

13. A system according to claim 12 wherein, when said ship is a sailboat, said data representing the ship in its dynamic operation correspond to a representation, in Cartesian or polar coordinates, of the ship's speed, expressed in knots, with respect to the angle of direction of the wind with reference to the ship's center line.

14. A system according to claim 13, wherein the data correspond to the ship's relative surface or sea bed speed and the angles of direction of the wind at the angle of direction of the true wind and that of the apparent wind.

15. A system according to claim 13, wherein said values comprise noteworthy reference values for which the ship's "velocity made good" is at its maximum value in the cases of windward navigation and downwind navigation.

16. A system according to claim 13, wherein said data representing the ship, when it is a sailboat, correspond to a choice of combination of sails according to wind forecasts, the choice of combination of sails corresponding to that for which the changing of foresail, jib or genoa takes place as late as possible.

17. A system according to claim 1 wherein, in order to integrate parameters intrinsic to the helmsman of each ship, consisting of a sailboat, into the navigation assistance system, said computing means of said central station and/or said first master microcomputer comprise, stored in their storage memory, data representing the ideally steered ship or sailboat, the ideal character of the steering of said sailboat being defined as the maintaining of a substantially constant phase angle relationship between the course defined and held to by the helmsman, for the sailboat, and the direction of the true wind.

18. A system according to claim 17, wherein the direction of the true wind is defined, in time, as the mean azimuth corresponding to the direction of the true wind, on which is superimposed an instantaneous variation of this direction with respect to this mean direction, and a variation caused by turbulence phenomena, the direction of the true wind being defined as a wind zone.

19. A system according to claim 1 wherein, when the ships consist of sailboats about to take part in a competition regatta, said first data acquisition sub-program comprises:
   a control procedure enabling the display of raw data, from the different sensors, on the screen;
   a procedure to change the scale of the map of the navigation zone;
   a procedure for the input of the position in latitude and longitude of the marks of the regatta course;
   a procedure to validate the time remaining before the start;
   a procedure to introduce the value of the sea current in terms of direction and speed.

20. A system according to claim 19, wherein said procedure for the input of the position, in latitude and longitude, of the marks of the regatta course, comprise the sub-routines:
   for the input of the coordinates of the course marks or buoys in latitude and longitude;
   for the validation of the committee boat;
   for the validation of the starting mark;
   for the input of the mean azimuth of the course;
   for the validation of the last mark of the course;
   for the input of the course length;
   for the validation of the return stage.

21. A system according to claim 1 wherein, following the passage to the starting mode, said program corresponding to the starting mode enables, on the display screen of each ship, the display, on a corresponding screen page:
   of the windward zone beyond the starting line;
   of an arrow indicating the azimuthal direction of the instantaneous true wind;
   of a line perpendicular to the direction of the true wind, thus indicating the advantageous side, for port tacking or starboard tacking, of the line;
   of lay-lines defining, for the sailboat considered, the permitted limit zone in which said sailboat can perform tacking manoeuvers;
   the effective path of the sailboat in said limit zone;
   a timer.

22. A system according to claim 1 wherein, following the validation of the navigation mode, in the case of sailboats in competition, said navigation program is a program corresponding to a race mode comprising:
   a procedure to define and display lay-lines of the ship with respect to the next mark, said method comprising a sub-routine to compute and display the distance of the ship from the lay-line towards which it is moving, a distance which is parallel to the other lay-line.
   a procedure for changing scale, and
   a procedure to display the direction of the true wind in a determined, previous period of time;
   a so-called burgee procedure making it possible to indicate the zones of change in the wind;
   a downwind navigation procedure;
   a mark-validating procedure enabling the master computer, upon validation by the tactician helmsman, to take the tacking into account;
   a procedure to return to the main menu.

23. A system according to claim 22, wherein said procedure for the definition and display of the lay-lines of the sailboat enable the display of these lines on a screen page in a pie chart type of diagram, said diagram comprising a plurality of circular sectors comprising:
   two limit circular sectors defining an angular zone corresponding to the limits of the lay-lines as a function of the relief, said limits being computed from the sea-bed position of the ship with respect to the coastline;
   two first lines, contained in said limit zone and defining an angular zone corresponding to two lay-lines computed with respect to the sea bed, namely to the coastline;
   two second lines, contained in said limit zone and defining an angular zone corresponding to two surface lay-lines, computed from the surface speed of the ship and of the apparent wind, these parameters being given by the different sensors;
   two third lines, contained in said limit zone and defining an angular zone corresponding, given the hydrodynamic characteristics of the ship, to ideal functioning
   two fourth lines, contained in said limit zone and defining an angular zone corresponding to lay-lines that represent, in time, changes in the direction of the wind with respect to the hourly scale, said lay-lines being determined from statistics on changes in the wind, in time, at the corresponding navigation zone.

24. A system according to claim 22 or 23, wherein said procedure to display the direction of the true wind in a determined, prior time period and said burgee procedure enable the display to show the chronology of the direction of the true wind since the beginning of the recording, on a screen page, in a pie chart type of diagram, with indications of right-hand and left-hand extremes in the instantaneous direction of the true wind, the instantaneous direction of the true wind, and the estimate of changes in the direction of the true wind at a given time.

25. A system according to claim 1, wherein said tactical program for assistance with navigation comprises, after a stage of various initialization operations, a general repetition loop into which the sub-programs corresponding to the approach mode, the starting mode and the navigation or race mode, are integrated.

* * * * *